United States Patent
Brito et al.

(10) Patent No.: US 8,001,154 B2
(45) Date of Patent: Aug. 16, 2011

(54) LIBRARY DESCRIPTION OF THE USER INTERFACE FOR FEDERATED SEARCH RESULTS

(75) Inventors: Carlos Brito, Sammamish, WA (US); Christopher Clayton McConnell, Redmond, WA (US); Shannon Scott Hysom, Issaquah, WA (US); Paolo Marcucci, Seattle, WA (US); Tyler Kien Beam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 12/147,176

(22) Filed: Jun. 26, 2008

(65) Prior Publication Data

US 2009/0327226 A1    Dec. 31, 2009

(51) Int. Cl.
*G06F 7/00* (2006.01)

(52) U.S. Cl. .................................. 707/796; 707/803

(58) Field of Classification Search ............ None
See application file for complete search history.

(56) References Cited

U.S. PATENT DOCUMENTS

| | | | |
|---|---|---|---|
| 5,809,497 A * | 9/1998 | Freund et al. ............... 1/1 |
| 6,490,579 B1 * | 12/2002 | Gao et al. ............... 707/707 |
| 6,701,314 B1 * | 3/2004 | Conover et al. ............ 707/740 |
| 6,721,736 B1 * | 4/2004 | Krug et al. ............... 707/634 |
| 6,944,612 B2 * | 9/2005 | Roustant et al. ........... 707/706 |
| 7,171,415 B2 | 1/2007 | Kan |
| 7,177,862 B2 | 2/2007 | Zhang |
| 7,254,285 B1 * | 8/2007 | Paek et al. ............... 382/305 |
| 7,263,551 B2 | 8/2007 | Belfiore |
| 2004/0093321 A1 | 5/2004 | Roustant et al. |
| 2004/0111393 A1 * | 6/2004 | Moore et al. ............... 707/3 |
| 2005/0204014 A1 * | 9/2005 | Yao et al. ............... 709/217 |
| 2005/0278321 A1 | 12/2005 | Vailaya |
| 2006/0053092 A1 | 3/2006 | Foo et al. |
| 2006/0259476 A1 | 11/2006 | Kadayam |
| 2007/0011179 A1 * | 1/2007 | Paval ............... 707/100 |
| 2007/0192300 A1 | 8/2007 | Reuther et al. |
| 2007/0220268 A1 | 9/2007 | Krishnaprasad |
| 2008/0004992 A1 | 1/2008 | King |
| 2008/0005194 A1 | 1/2008 | Smolen |
| 2009/0222411 A1 * | 9/2009 | Marcucci et al. ........... 707/3 |
| 2009/0248706 A1 * | 10/2009 | Fields et al. ............... 707/100 |

OTHER PUBLICATIONS

International Search Report for PCT/US2009/048938 dated Jan. 27, 2010.
ProQuest XML Gateway, retrieved date Mar. 28, 2008, 2 pages, http://www.proquest.com/products_pq/proquest/previews/xml.shtml.
ZPORTAL Federated Search Portal at a glance, retrieved date Mar. 28, 2008, 3 pages, http://www.oclc.org/zportal/about/default.htm.

(Continued)

*Primary Examiner* — Vei-Chung Liang
(74) *Attorney, Agent, or Firm* — Shook, Hardy & Bacon L.L.P.

(57) ABSTRACT

Methods and computer-readable media are provided for performing a federated search using a library description file to locate multiple data sources. For a federated search, a library description can be used to describe a set of data sources searched, and may further be used to describe how search results should be presented to a user. The format of such a library description file can include multiple elements, some of which provide information on how to display the library and others that define which data sources are included in the library. The library description file can be created according to library description template.

8 Claims, 4 Drawing Sheets

OTHER PUBLICATIONS

Jurgen Dorn, et al., "Meta-Search in Human Resource Management," PWASET vol. 21 Jan. 2007, 6 pages, http://www.waset.org/pwaset/v19/v19-23.pdf.

Metasearch XML Gateway Implementers Guide Version 1.0, National Information Standards Organization, Aug. 7, 2006, 24 pages, http://www.niso.org/standards/resources/RP-2006-02.pdf.

* cited by examiner

LIBRARY DESCRIPTION OF THE USER INTERFACE FOR FEDERATED SEARCH RESULTS

BACKGROUND

Federated searches are those performed across multiple data sources at once, thereby providing a user efficient mechanism to search across many data sources with the issuance of a single search query. A collection of data sources that share similar properties can be grouped into a library.

SUMMARY

In a federated search environment, a library description file can be used to describe a collection of locations. The format of a library description file can provide several elements, such as information on how to present the library to a user and other elements that define how to present search results for the library. Methods are also provided for the creation of library description files.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A federated search is a search performed simultaneously upon multiple data sources. To aid in the efficiency of executing a federated search, multiple data sources can be grouped together into a library. The library can be comprised of data sources that have similar properties or characteristics. A user can decide which data sources to group together into a library. Additionally, defaults can set by the user or computing device that provide for the automatic grouping of data sources into a library based on properties or characteristics of the data source. A library description file can be created that describes, among other things, the data sources contained within the library as well as other properties of the library. A user may then select a particular library to perform a federated search upon, thereby providing a more efficient or effective search.

In one embodiment of the invention, computer storage media with a data structure stored thereon is provided for storing data representing library description files associated with libraries. The data structure includes a first field containing data representing one or more location library elements, wherein one or more libraries are comprised of one or more location elements. A second data field contains data representing a display format element for the one or more libraries. A third data field is provided that is derived from the first and second data fields, and represents a library description format for the one or more locations.

In another embodiment of the invention, a method of generating library description files is provided. A description of one more locations is received that contains information describing a data source of the locations. The locations are then grouped based on predefined criteria into one or more groups. Library description files are created for each of the groups and stored on a computer-readable medium.

In another embodiment, computer storage with computer-executable instructions embodied thereon are provided for performing a method of executing a federated search upon libraries and displaying the libraries and search results according to library description files. A search query is received along with a selection of libraries to perform the search query upon. Each of the libraries have corresponding library description files. A list of search results is generated by accessing locations defined by the library description files. The list of search results and libraries searched are presented in an arrangement defined by the library description files.

Having briefly described an overview of embodiments of the present invention, an exemplary operating environment suitable for use in implementing embodiments of the present invention is described below.

Figure 1:
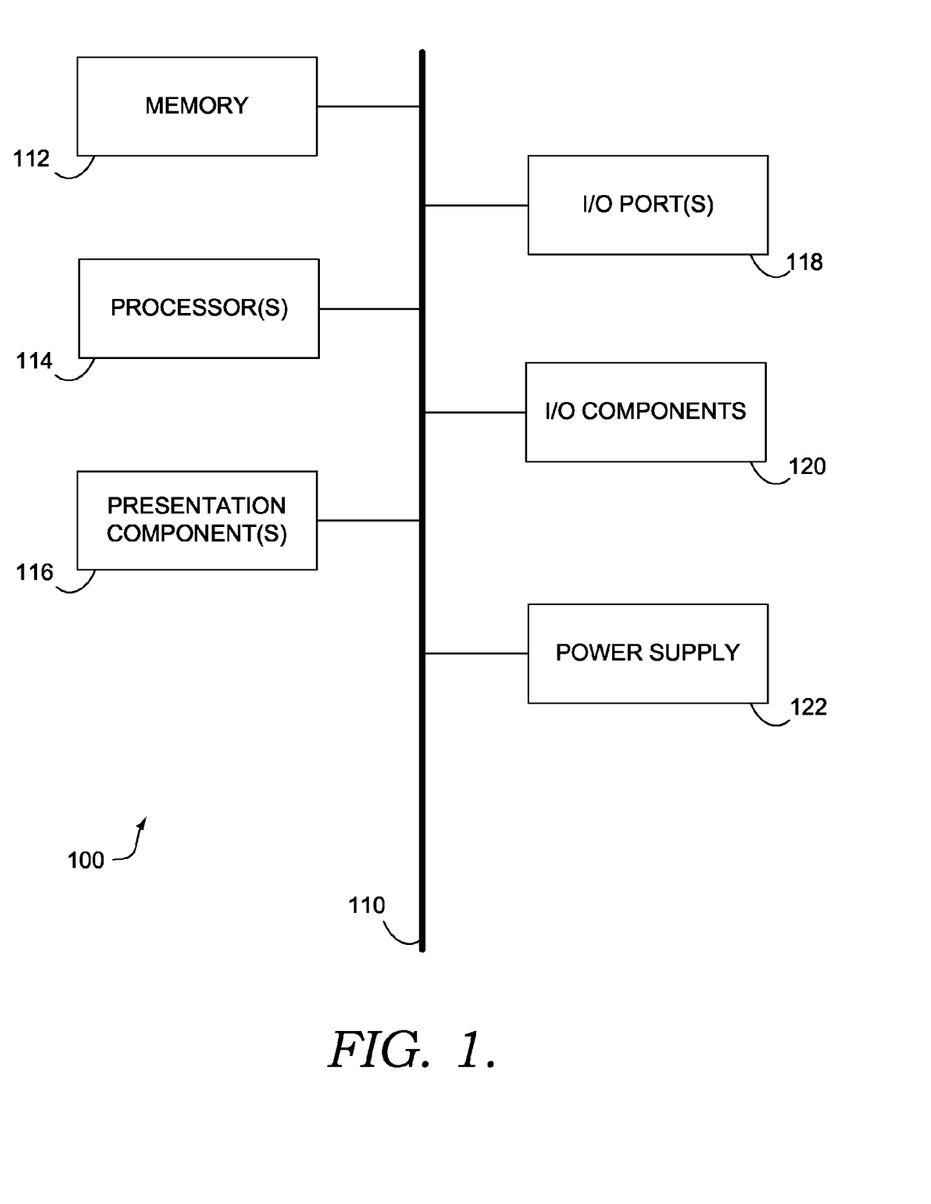
FIG. 1 is a block diagram of a computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other hand-held device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
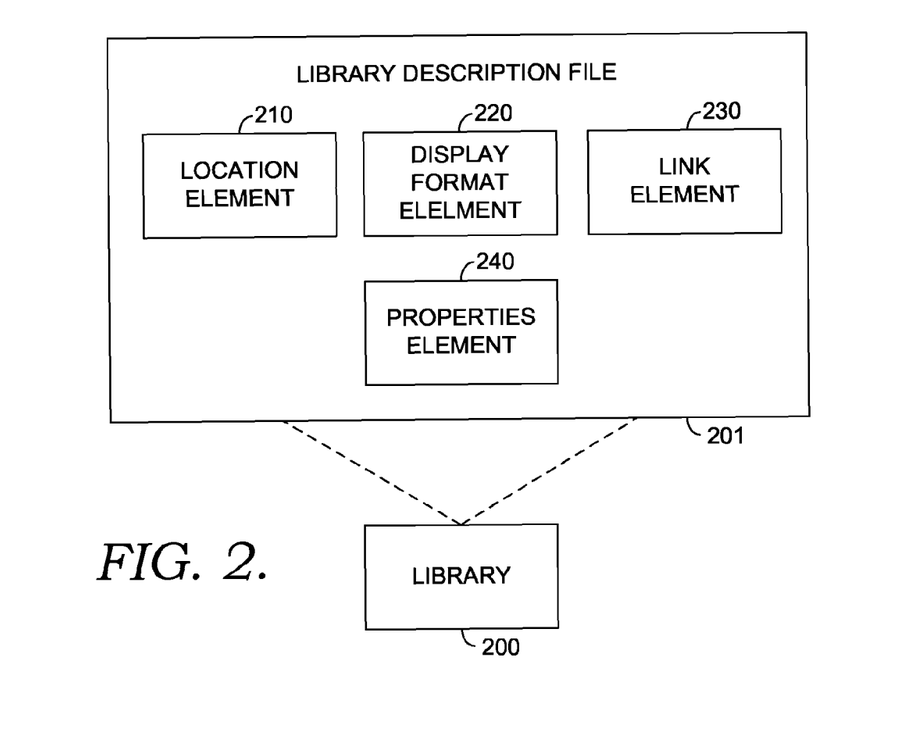
FIG. 2 is a block diagram illustrating an library description file in accordance with an embodiment of the invention.

Turning now to FIG. 2, a block diagram is presented that illustrates a library description file. The library description file 201 can include a plurality of elements that define the characteristics and properties of the library 200. Included within the library description file 201 can be a location element 210, a display format element 220, a link element 230, and a properties element 240.

It will be appreciated that location 210, display format element 220, link element 230, and properties element 240 can be XML elements, with the location description file being the root element. Besides the elements displayed in FIG. 2, other elements may be included as well, such as a name element, a description element, an author element, a scope element, or a condition list element. For example, a name element can be used to display the name of the library, and a description element can include a description of the library. An author element can be used to display the author or owner of the location description file. By way of example only, a scope element may be used to provide information related to the scope of the locations associated with the library 200. The scope element can provide exclusions to the search upon the library 200. In general, these elements provide a way to display the library description file 210 or information related to the library description file 210.

The location element 210 can define the information necessary to connect to a data source. The data source can be any source of information that a user desires to search. For example, a user's email service could be a data source. In instances where a user accesses multiple email services, either through the internet and webmail services or other methods, each of the email services would be a data source. Each of the data sources then has a corresponding location element 210 that defines information necessary to connect to the data source.

The display format element 220 defines how the library 200 should be presented. This can be information regarding the icon or other visual indicia that should be used to represent the library in a user interface of the computing device. In addition, the display format element 220 can include information as to how search results are presented for search queries performed upon the library 200.

The link element 230 is a shell link type element point to an icon (e.g., in icon image file format) representing the library description file, or a template for creating the library description file. A shell link is a data object that contains information used to access another object. The types of objects that can be access through shell links include folders, files, disk drivers, or printers. A shell link therefore allows a user or an application to access an object from anywhere in the namespace, even if the user or the application does not know the current name and location of the object.

The properties element 240 can include information concerning the properties of the library 200. This can include information, for instance, detailing the format and syntax required of search queries that are issued to the library. It can also include information detailing the general content of the library and the data sources included therein.

The library description file 201 can be communicated to other users via a variety of methods. The library description file 201 can be downloaded to a user's device, where it may be added to the user's library of locations and corresponding data sources to be searched. Alternatively, the user can receive library description file 201 as an attachment in an email, and after the user downloads the library description file 201 it can be added to the user's list of libraries to be searched. One skilled in that art will appreciate that the self-contained nature of the library description file 201 allows such a file to be share easily, via URL or email, amongst users.

Figure 3:
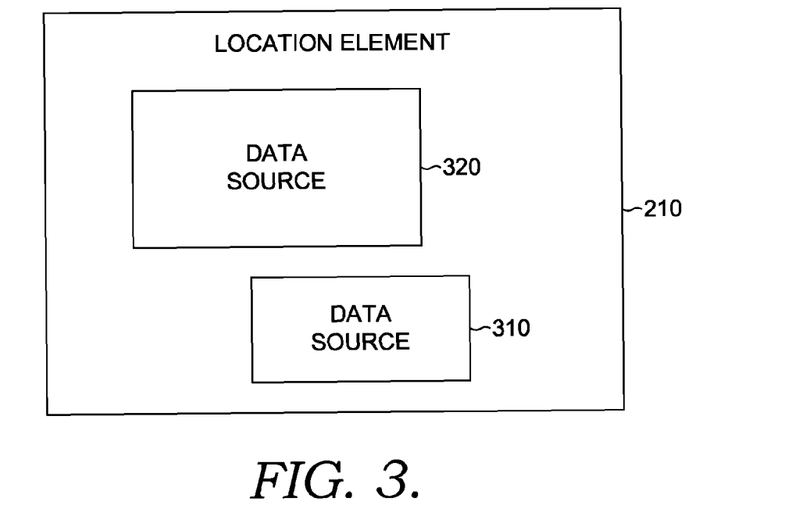
FIG. 3 is a block diagram illustrating a location element in accordance with an embodiment of the invention.

With reference now to FIG. 3, a block diagram illustrating a location element is presented in accordance with an embodiment of the invention. The location element 210, also depicted in relation to FIG. 2, can contain information describing data sources 310 and 320. The representation of data sources 310 and 320 within location element 210 is for purposes of discussion only, as the data sources 310 and 320 are not physically contained with the location element 210. Rather, the location element 210 contains information that the data sources 310 and 320 and methods for communicating with data sources 310 and 320.

As described above in relation to FIG. 2, the data source 310 can be any source of information that a user desires to search. For example, a user's collection of digital images or pictures could be a data source. In instances where a user accesses pictures from multiple storage locations, such as an internet photo sharing website or pictures stored locally on the user's computing device, each of the storage locations would be a data source. Each of the data sources then has a corresponding location element 210 that defines information necessary to connect to the data source.

Figure 4:
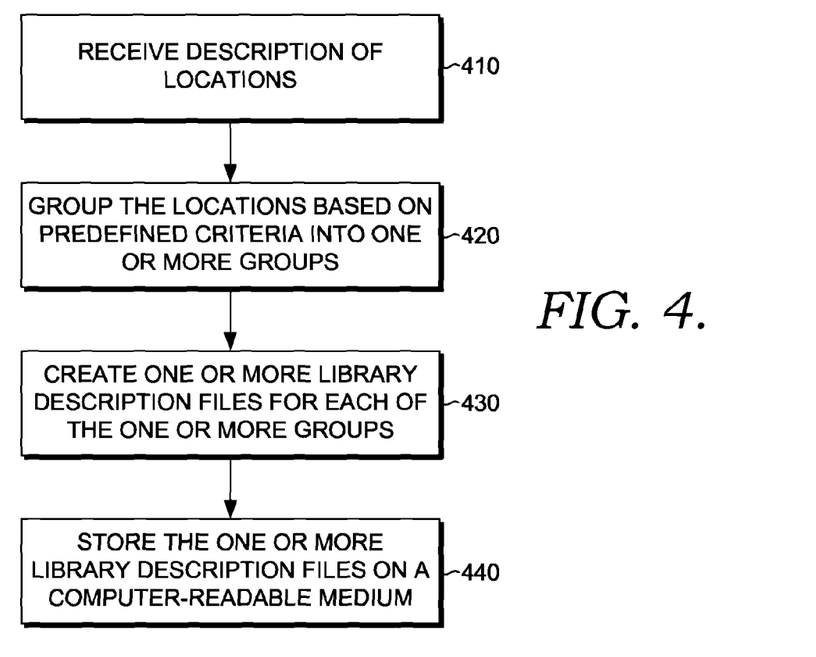
FIG. 4 is a flow diagram illustrating a method for creating a library description file in accordance with an embodiment of the invention.

With reference now to FIG. 4, a flow diagram illustrating a method for creating a library description file is presented, according to an embodiment of the invention. In block 410, a description is received of one or more locations. The description contains information describing a data source of each of the locations. The information can define the content of the data source, such as if the data source contains emails, document, or pictures.

At block 420, the locations are grouped based on predefined criteria into one or more groups. The groups can be referred to as libraries. The predefined criteria can group the locations based on their content, with locations having similar content being grouped together. For instance, all locations containing emails could be grouped together into a library. Additionally, other criteria can be used to group the locations into libraries. For example, locations containing data that is created by the same entity or author could be grouped together into a library. In this manner, a location containing video files created by a particular artist could be grouped with a location containing audio files created by the particular artist. While exemplary criteria have been provided for the sake of clarity, it should be understood that any number of criteria can be used to group locations into a library.

In block 430, library description files are created for each of the groups. The library description file is comprised of multiple elements that describe the libraries. The elements can be similar to those described in relation to FIG. 2, above. Generally, the information can include elements that define the content of the library, such as the locations included therein. In addition, elements in the library description file can define the appearance of the library in the user interface of the computing device. This can include a particular icon or graphic style that should be used in presenting the library in the user interface. Elements can also define the appearance of search results that are generated upon a search of the library.

The library description file can also be created according to a library description file template. This template can define the syntax and layout of the file, and ensures that library description files are created in a consistent manner. In this manner, library description files can be created according to a standard format. After the creation of the library description files in block 430, they are stored on a computer-readable medium in block 440.

Figure 5:
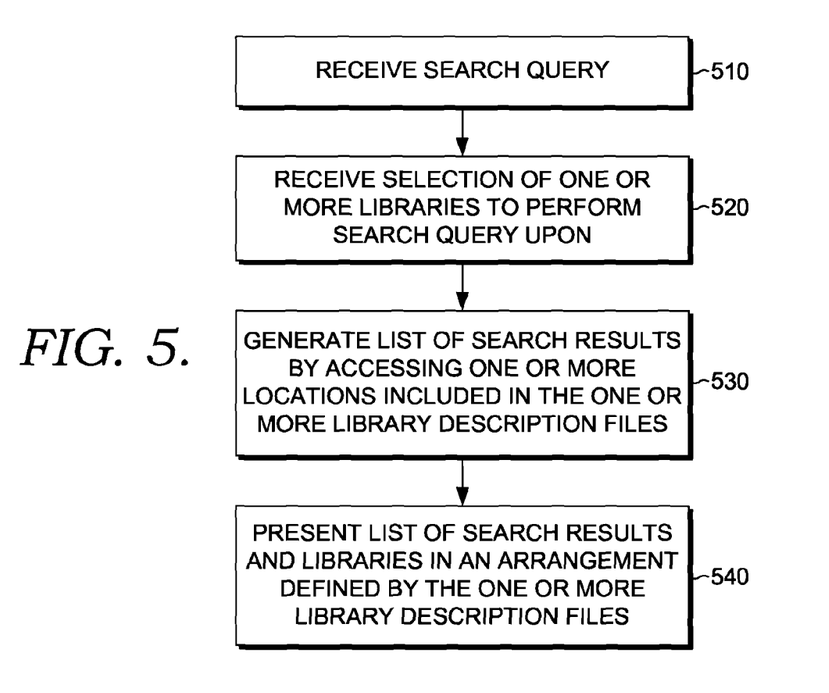
FIG. 5 is a flow diagram illustrating a method for performing a federated search upon a library and displaying the library and search results according to library description files, in accordance with an embodiment of the invention.

Turning now to FIG. 5, a flow diagram depicting a method for performing a federated search upon a library and displaying the library and search results according to library description files is presented. In block 510 a search query is received. The search query may be issued by a user into a computing device. The library description files of the one or more libraries selected by a user in block 520 can define the format of the search query that can be conducted upon the corresponding library. The portion of the user interface for receiving a search query from the user could then be altered based on the format required by the library description file.

A selection of libraries to perform the search query upon is received at block 520. Each of the libraries can include one or more locations and corresponding data sources. A corresponding library description file is provided that, among other things, describes the locations included in the library and their capabilities. Specific libraries can include information that is related in content. For instance, a library could be created that includes documents that have similar content or subject matter. A library could then be created for a user's financial documents. The documents can reside in different locations and corresponding data sources, which in this example might be directories on in computer readable medium on the computing device. A library would then include the directories that contain financial documents. A user would therefore be able to perform a more effective and efficient search by selecting a specific library to search, a more efficient and effective search can be performed across the locations and data sources.

At block 530, a list of search results is generated by accessing locations included in the library description files. The list of search results can be generated by applying a search algorithm to the selected libraries. The search algorithm seeks to find information in the libraries that likely satisfies the search query. One skilled in the art will recognize that there are numerous ways to perform a search, and as such, further description of search algorithms will not be provided.

In block 540, a list of search results and the libraries from which they were generated are presented in an arrangement defined by the library description files. The library description files can define the visual appearance of both the library and the search result lists. For instance, the formatting of the search results in the user interface can be specified by the library description files. Further, the appearance of the search results can be specified in the library description file.

Figure 6:
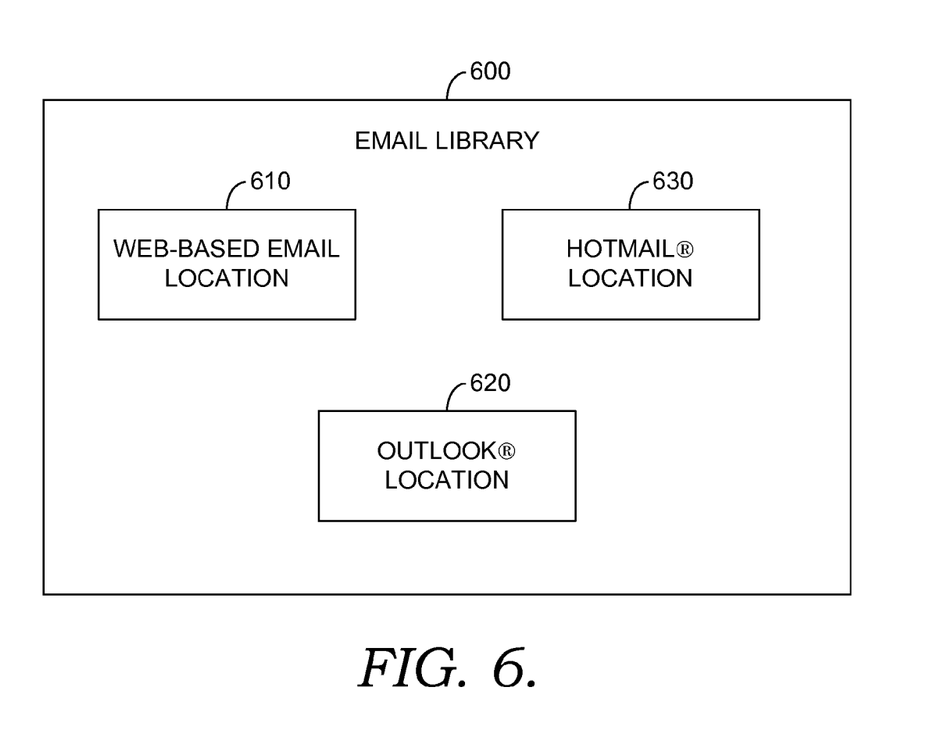
FIG. 6 is block diagram illustrating an exemplary library in accordance with an embodiment of the invention.

With reference now to FIG. 6, a block diagram illustrating an exemplary library in accordance with an embodiment of the invention is presented. Email library 600 is a typical library that is comprised of multiple locations and corresponding data sources. Included within the email library 600 is a web-based email location 610, an Outlook® location 620, and a Hotmail® location 630. Both Outlook® and Hotmail® are registered trademarks of the Microsoft Corporation, headquartered in Redmond, Wash. Included with the locations 610, 620 and 630 can be information describing the location of the corresponding data sources. This information can take many forms and serves to provide the location of the corresponding data source. When a search is made upon the email library 600, the data sources corresponding to the locations 610, 620 and 630 can be located and searched accordingly.

Each of the locations 610, 620 and 630 contain similar content, namely email, and are grouped together into the email library 600. A library description file for the email library 600 can then include information describing the content of the locations 610, 620 and 630 and corresponding data sources. The file can also include information describing how to present the email library 600 in the user interface. The presentation of the search results generated upon a search of the email library 600 can also be defined in the library description file.

Additionally, the library description file can define the syntax and other characteristics or specific features of search queries that can be carried out on the email library 600. These specific features can include ways to search the library or filter search result generated upon a search of the library.

In the case of the email library 600, these can take the form of particular types of search queries, such as those limited to the subject line of emails, or the sender of the email. In libraries described above, such as those relating to pictures, the specific features could be related to allowing search queries for pictures that contain particular subjects. This example can be effectuated by analyzing information contained in the metadata for each picture in a library in order to the identity of the subject of the picture.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method of creating a library description file, the method comprising:
   receiving, at a computing device, a description of one or more locations, said description containing information describing a data source of each of the one or more locations;
   automatically grouping, at the computing device, a subset of the one or more locations based on predefined criteria into a library, wherein the library is a group of data sources grouped together for simultaneous searching, and wherein the data sources are at different locations;
   creating, at a computing device, a library description file for the library, wherein said library description file is comprised of information describing the library including a display format element for the library, at least one location element for the library, a library description format, a scope element, a properties element, and a shell link element, wherein the display format element defines formatting of a visual indicia used to represent the library in a user interface and for how search results are presented for search queries performed upon the library, wherein the location element contains methods for communicating within the group of data sources, wherein the library description format is created using a standard library description format and is a XML root element, wherein the scope element provides information related to scopes of the one or more locations associated with the library and exclusions to searchers upon the library, wherein the properties element includes information detailing a format and a syntax required of search queries that are issued to the library, and wherein the shell link element points to the visual indicia representing the library description file; and
   storing the library description file on a computer-readable medium.

2. The method of claim 1, wherein the information describing the data source of the location defines a content of the data source corresponding to the one or more locations.

3. The method of claim 2, wherein the criteria define that locations are grouped into libraries based on their content.

4. The method of claim 1, wherein the library description file is created using a library description template.

5. One or more computer storage media with computer-executable instructions embodied thereon for performing a method of executing a federated search of one or more libraries and displaying the one or more libraries and search results according to one or more library description files, the method comprising:
   receiving a search query;
   receiving a selection of one or more libraries to perform the search query upon, wherein said one or more libraries have corresponding library description files, wherein the library is a group of data sources grouped together for simultaneous searching, and wherein the data sources comprise a data first source with a local location and a second data with a remote location;
   generating a list of search results by accessing one or more locations defined by the one or more library description files; and
   presenting a list of search results and libraries in an arrangement defined by the one or more library description files, wherein an appearance of the libraries is defined by a display format element within the one or more library description files, wherein the display format element defines formatting of a visual indicia used to represent the library in a user interface and for how search results are presented for search queries performed upon the library, wherein a library description file further comprises at least one location element for the library, a library description format, a scope element, a properties element, and a shell link element, wherein the location element contains methods for communicating within the group of data sources, wherein the library description format is created using a standard library description format and is a XML root element, wherein the scope element provides information related to scopes of the one or more locations associated with the library and exclusions to searchers upon the library, wherein the properties element includes information detailing a format and a syntax required of search queries that are issued to the library, and wherein the shell link element points to the visual indicia representing the library description file.

6. The one or more computer storage media of claim 5, wherein the library description file is generated using library description template.

7. One or more computer storage media having stored thereon a data structure for storing data representing library description files associated with libraries, the data structures comprising:
   a first data field containing data representing multiple location elements, wherein each of the location elements identify a data source associated with a library and information needed to connect to the data source, wherein the library is a group of data sources grouped together for simultaneous searching, and wherein the data sources are not physically contained within the library, and wherein the each of the location elements includes methods for communicating within the group of data sources;
   a second data field containing data representing a display format element for the one or more libraries, wherein the display format element defines formatting of a visual indicia used to represent the library in a user interface, and wherein the display format element includes information defining how search results are presented for search queries performed upon the library;
   a third data field derived from the first and second data fields representing a library description format of the group of data sources and being an Extensible Markup Language ("XML") root element, and wherein the library description format is created using a standard library description format;
   a fourth data field containing data representing a scope element providing information related to scopes of locations associated with the library, wherein the scope element provides exclusions to searchers upon the library;

a fifth data field containing data representing a properties element including information detailing a format and a syntax required of search queries that are issued to the library; and a sixth data field containing data representing a shell link element, wherein the shell link element points to an icon representing the library description file.

8. The one or more computer storage media of claim 7, wherein the data structure further comprises a data field including link elements corresponding to the group of data sources.

* * * * *